(12) United States Patent
Trindade et al.

(10) Patent No.: US 7,258,528 B2
(45) Date of Patent: Aug. 21, 2007

(54) INTERNALLY COOLED AIRFOIL FOR A GAS TURBINE ENGINE AND METHOD

(75) Inventors: Ricardo Trindade, Coventry, CT (US); Michael Leslie Clyde Papple, Ile des Soeurs (CA); Toufik Djeridane, St. Bruno (CA); Sri Sreekanth, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 68 days.

(21) Appl. No.: 11/000,957

(22) Filed: Dec. 2, 2004

(65) Prior Publication Data

US 2006/0120870 A1    Jun. 8, 2006

(51) Int. Cl.
*F01D 5/08* (2006.01)

(52) U.S. Cl. ............... 416/96 A; 416/224; 416/233
(58) Field of Classification Search ............ 416/96 A, 416/224, 232, 233
See application file for complete search history.

(56) References Cited

U.S. PATENT DOCUMENTS

| | | | | |
|---|---|---|---|---|
| 3,373,970 | A | * | 3/1968 | Heinz ................. 416/96 A |
| 3,574,481 | A | * | 4/1971 | Pyne et al. ............ 416/97 R |
| 3,628,880 | A | * | 12/1971 | Smuland et al. ........ 416/96 A |

* cited by examiner

*Primary Examiner*—Richard A. Edgar
(74) *Attorney, Agent, or Firm*—Bachman & LaPointe, P.C.

(57) ABSTRACT

An internally-cooled airfoil for a gas turbine engine, wherein the airfoil comprises at least one substantially chordwise-extending and internally-projecting stiffener located on an internal surface of one of the sidewalls and adjacent to the insert.

13 Claims, 3 Drawing Sheets

INTERNALLY COOLED AIRFOIL FOR A GAS TURBINE ENGINE AND METHOD

TECHNICAL FIELD

The invention relates generally to airfoils for gas turbine engines and, more particularly, to an improved internally cooled airfoil and an improved method for increasing the rigidity of a sidewall in an internally cooled airfoil.

BACKGROUND OF THE ART

Some airfoils, particularly large ones, are provided with inserts during manufacturing. An airfoil may have one or more inserts, depending of the design. Each insert is located in a corresponding internal cavity of the airfoil core.

The presence of one or more inserts inside an airfoil offers many advantages. However, there are some drawbacks as well. One of them is that at the location of the insert, pedestals or ribs can no longer be used for interconnecting the internal surfaces of opposite sidewalls. These interconnections help maintain the overall rigidity of both sidewalls, thereby preventing or reducing cracking because of the deflection of the sidewalls. Cracking is also due in part to thermal variations, as the skin of the airfoil is exposed to the hot gas path, and the rib-pedestals are relatively cooler because of the cooling air circulating therein. Zones of relatively high mechanical stresses can occur in one or more sidewalls, particularly at a junction between a rib and a spanning portion of one of the sidewalls adjacent to the insert, or at a junction between a cooling pedestal and a spanning portion of one of the sidewalls adjacent to the insert.

Accordingly, there is a need to mitigate the problem of cracking at zones of high mechanical stresses in the sidewalls of airfoils.

SUMMARY OF THE INVENTION

In one aspect, the present invention provides an internally-cooled airfoil for a gas turbine engine, the airfoil having at least one internal cooling passage generally located between opposite pressure and suction sidewalls and including an insert therein, the airfoil comprising at least one substantially chordwise-extending and internally-projecting stiffener located on an internal surface of one of the sidewalls and adjacent to the insert.

In a second aspect, the present invention provides an airfoil core for use in a gas turbine engine, the airfoil core having internal surfaces and comprising: at least one cooling air passage located inside the airfoil core and defined at least in part by the internal surfaces, the passage comprising a cavity for an insert; and at least one stiffener extending from one of the internal surfaces of the airfoil core adjacent to the cavity for the insert, the stiffener integrated with an adjacent structure, the adjacent structure extending from said one of the internal surfaces.

In a third aspect, the present invention provides a method for increasing rigidity of a sidewall in an internally-cooled airfoil for a gas turbine engine, the airfoil comprising at least one internal cooling passage generally located between opposite pressure and suction sidewalls and in which is located a cavity for an insert, the method comprising: casting the airfoil; and during the casting, providing at least one stiffener located inside one of the sidewalls and adjacent to the cavity for the insert.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
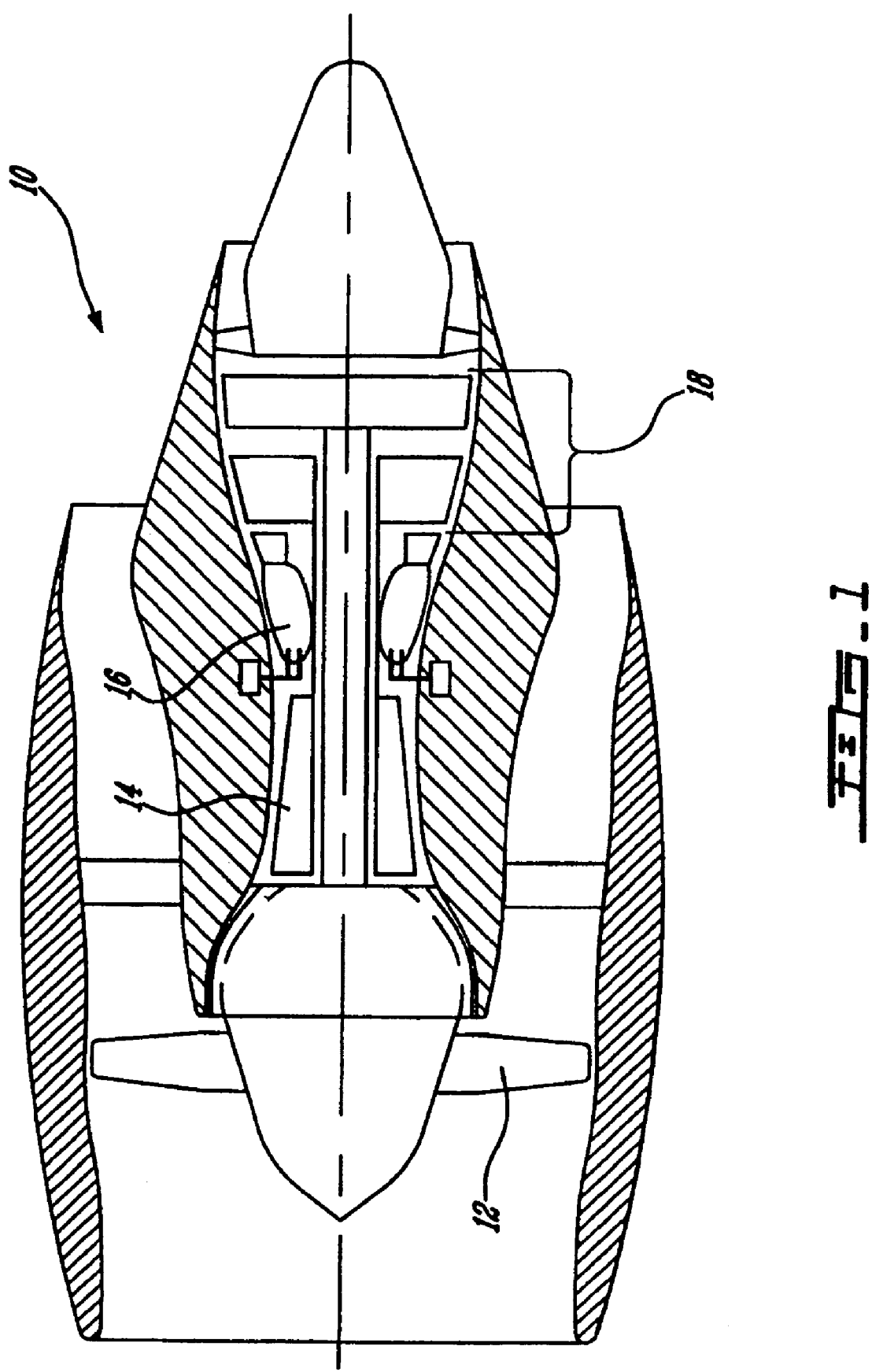
FIG. 1 schematically shows a generic gas turbine engine to illustrate an example of a general environment in which the invention can be used.

FIG. 1 schematically illustrates an example of a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. This figure illustrates an example of the environment in which the present invention can be used.

Figure 2:
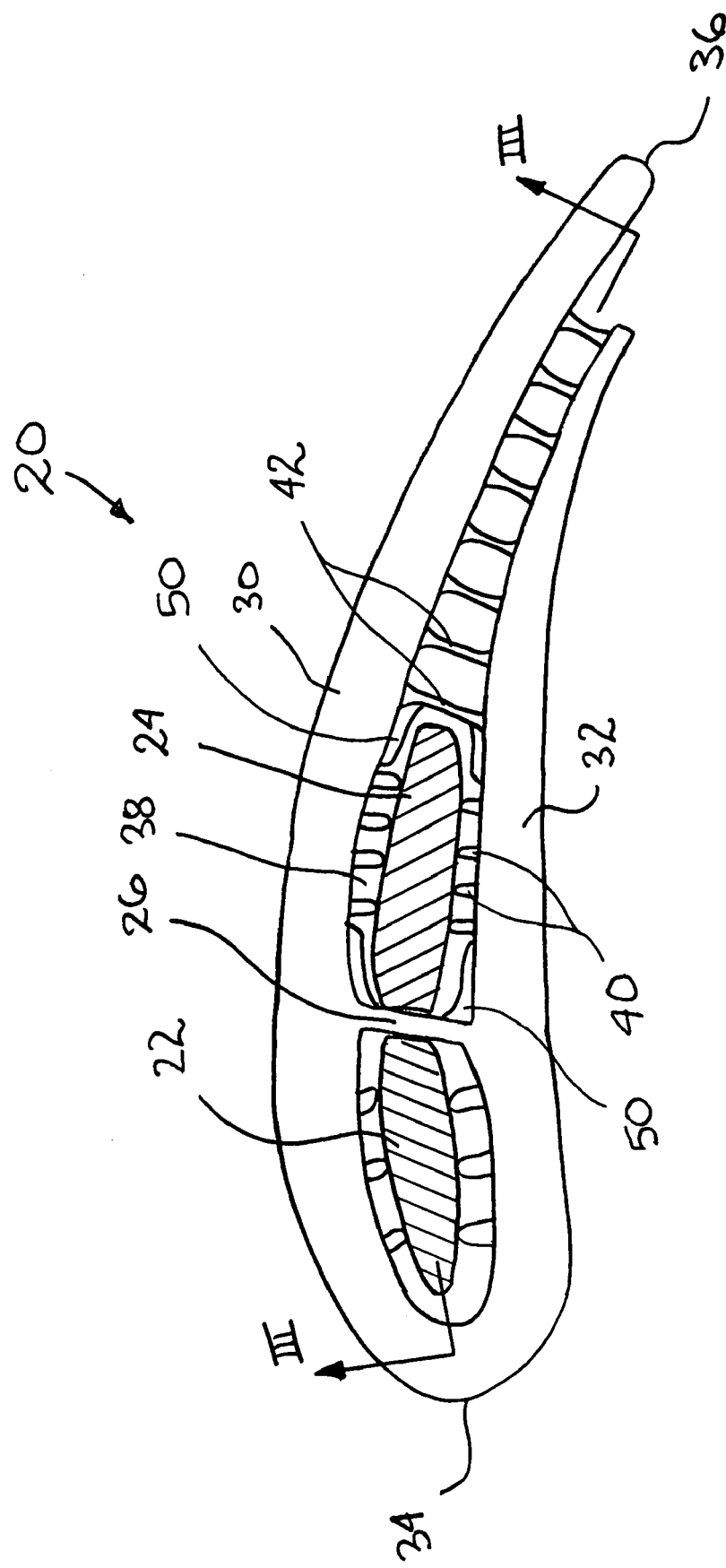
FIG. 2 is a cross-sectional view of an airfoil in accordance with a preferred embodiment of the present invention.

FIG. 2 shows a cross-sectional view of an airfoil 20 in accordance with a preferred embodiment of the present invention. This airfoil 20 is provided with two inserts 22, 24, both being separated by an internal rib 26. Each insert 22, 24 is located in an internal cooling passage of the airfoil 20. Using an airfoil with only one or more than two inserts is also possible.

The airfoil 20 comprises two sidewalls 30, 32 extending between a leading edge 34 and a trailing edge 36 of the airfoil 20. The sidewall 30 is convex on the outside and is referred to as the suction sidewall 30. The other sidewall 32 has a concave surface on the outside and is referred to as the pressure sidewall 32.

The rearmost insert 24 is positioned in a cavity 38 inside the core of the airfoil 20. It is maintained out of engagement with the internal surface of the sidewalls 30, 32 by mean of a plurality of standoffs 40. The standoffs 40 prevent the insert 24 from contacting the internal surfaces when expanding while being heated.

The airfoil 20 comprises a plurality of pedestals 42 extending between the opposite internal surfaces and on which cooling air impinges during operation of the gas turbine engine 10. These pedestals 42 improve the rigidity of the airfoil 20 and increase the heat transfer between the sidewalls 30, 32 and the cooling air.

In conventional airfoils, cracking can occur in one or both of the sidewalls in the area adjacent to one of the inserts. These cracks result from the flexion of the airfoil skin spanning on the side of an insert. Cracks are usually more likely to happen near a rib or a first pedestal, which is usually where the mechanical stresses are maximum. The mechanical stresses are further amplified by the fact that sidewalls are hotter than a rib or a pedestal, the structures being cooled by the cooling air circulating inside the airfoil.

To mitigate the above-mentioned problem, the airfoil 20 is provided with at least one substantially chordwise-extending and internally-projecting stiffener 50 located inside one of the sidewalls 30, 32 and adjacent to the rearmost insert 24.

One or more stiffeners 50 can be provided in only one of the sidewalls 30, 32 or on both sidewalls 30, 32. FIG. 2 shows four stiffeners 50 being provided around the rearmost insert 24.

The stiffeners 50 can be either integral with an adjacent structure, for instance the rib 26 or the first pedestal 42, or be independently provided. FIG. 2 shows that the frontmost set of stiffeners 50 is integral with the rib 26. It also shown that the rearmost set of stiffeners 50 can be integral with a corresponding pedestal 42. Stiffeners 50 can also be freestanding and can be provided in any number, but preferably in pairs.

Figure 3:
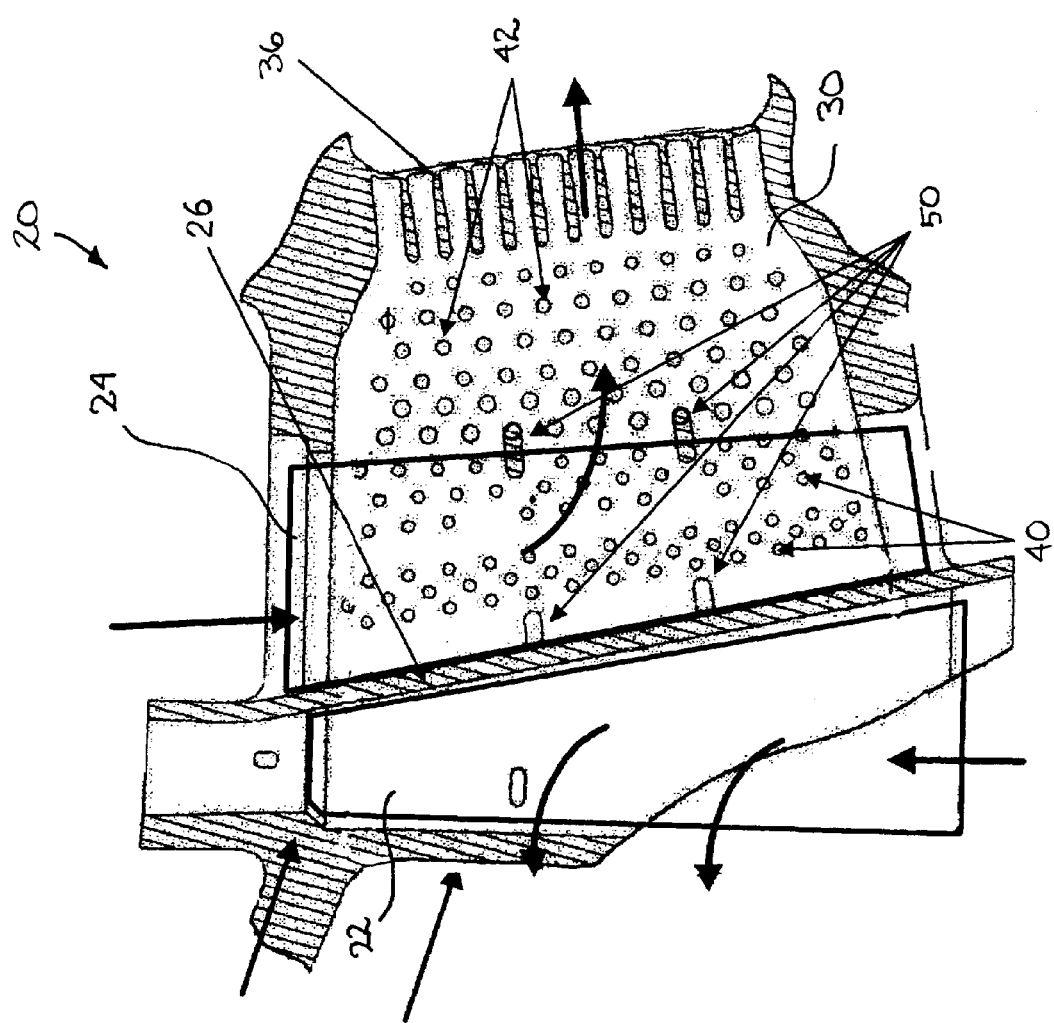
FIG. 3 is a partial schematic side view taken along line III-III in FIG. 2.

FIG. 3 is a partial schematic side view taken along line III-III in FIG. 2. It shows a schematic representation of the frontmost and the rearmost inserts 50. It also shows the stiffeners 50 located on the internal surface on the suction sidewall 30. This figure shows that there are two spaced-apart stiffeners 50 located adjacent to the rib 26, and also two spaced-apart stiffeners 50 located adjacent to the first row of pedestals 42. It also shows that the stiffeners 50 preferably have an oblong cross section.

The exact position of the stiffeners 50 and their number will depend on the specific design of the airfoil 20. They are preferably positioned where the mechanical stresses are the highest, thus in areas where cracks are the most likely to occur. Because the stiffeners 50 prevent or lessen skin flexion, the risks of cracking is substantially reduced.

As can be appreciated, the use of stiffeners 50 provides a way to enhance the rigidity of sidewalls in internally cooled airfoils for gas turbine engines. The method comprises casting the airfoil 20 and providing at least one stiffener 50 inside one of the sidewalls 30, 32 and adjacent to the receptacle of the insert during the casting.

The above description is meant to be exemplary only, and one skilled in the art will recognize that changes may be made to the embodiments described without department from the scope of the invention disclosed. For example, stiffeners can be provided on the suction sidewall only, on the pressure sidewall only or on both sidewalls at the same time. Stiffeners can be integral with an adjacent structure, such as a rib or a pedestal, or be free standing. The number, the position and the shape of the stiffeners can be different from what is shown on the drawings. The airfoil may have only one insert or more than two inserts, depending on the design. The present invention may be employed with any insert, and not simply the insert 24 described above. Still other modifications which fall within the scope of the present invention will be apparent to those skilled in the art, in light of a review of this disclosure, and such modifications are intended to fall within the appended claims.

What is claimed is:

1. An internally-cooled airfoil for a gas turbine engine, the airfoil having at least one internal cooling passage generally located between opposite pressure and suction sidewalls and including an insert therein, the airfoil comprising at least one substantially chordwise-extending and internally-projecting stiffener located on an internal surface of one of the sidewalls and extending towards the insert, the stiffener having two opposite ends and a height less than a distance between the internal surface and the insert at the location of the stiffener such that the stiffener is free from contact with the insert, one end of the stiffener being integral with an adjacent structure extending inwardly from the internal surface and the other end of the stiffener being freestanding.

2. The airfoil as defined in claim 1, wherein the at least one stiffener comprises a plurality of stiffeners provided on both the pressure and suction sidewalls.

3. The airfoil as defined in claim 1, wherein the adjacent structure is a vertically-extending rib projecting from the pressure sidewall to the suction sidewall.

4. The airfoil as defined in claim 1, wherein the adjacent structure is a pedestal.

5. The airfoil as defined in claim 1, wherein the stiffener extends about half the distance between the internal surface and the insert at the location of the stiffener.

6. The airfoil as defined in claim 1, wherein the stiffener has a leading edge-to-trailing edge dimension greater than a root-to-tip dimension of the stiffener, as measured relative to a leading and trailing edge, root and tip of the airfoil.

7. The airfoil as defined in claim 1, further comprising at least two of said stiffners, and wherein the stiffeners are disposed on the internal surface of the sidewall spaced apart from one another and on opposite sides of the sidewall.

8. An airfoil core for use in a gas turbine engine, the airfoil core having internal surfaces and comprising:
    at least one cooling air passage located inside the airfoil core and defined at least in part by the internal surfaces, the passage comprising a cavity for an insert; and
    at least one stiffener extending from one of the internal surfaces of the airfoil core defining the cavity for the insert, the stiffener having a height less than a distance from said one of the internal surfaces to the insert when positioned in the cavity, the stiffener having two opposite ends, at least one of which is integrated with an adjacent structure extending from said one of the internal surfaces, the other end of the stiffener being freestanding.

9. The airfoil core of claim 4, wherein the stiffener has a leading edge to trailing edge width relative to the airfoil which is greater than a root-to-tip height of the stiffener.

10. The airfoil core of claim 4, wherein the adjacent structure is at least one of a rib and a pedestal.

11. The airfoil core as defined in claim 4, further comprising at least two of said stiffeners, and wherein the stiffeners are disposed on the internal surface of said one of said internal surfaces spaced apart from one another and on opposite sides of an otherwise unsupported section of said one of said internal surfaces.

12. The airfoil core as defined in claim 4, wherein the stiffener extends about half the distance between said one of said internal surfaces and the insert at the location of the stiffener.

13. The airfoil core as defined in claim 4, wherein the adjacent structure is a vertically-extending rib projecting from said one of the internal surfaces of the airfoil core to another of the internal surfaces.

* * * * *